J. F. JOHNSTON.
TELEMOTOR.
APPLICATION FILED MAY 9, 1917.

1,302,376.

Patented Apr. 29, 1919.
12 SHEETS—SHEET 1.

J. F. JOHNSTON.
TELEMOTOR.
APPLICATION FILED MAY 9, 1917.

1,302,376.

Patented Apr. 29, 1919.
12 SHEETS—SHEET 3.

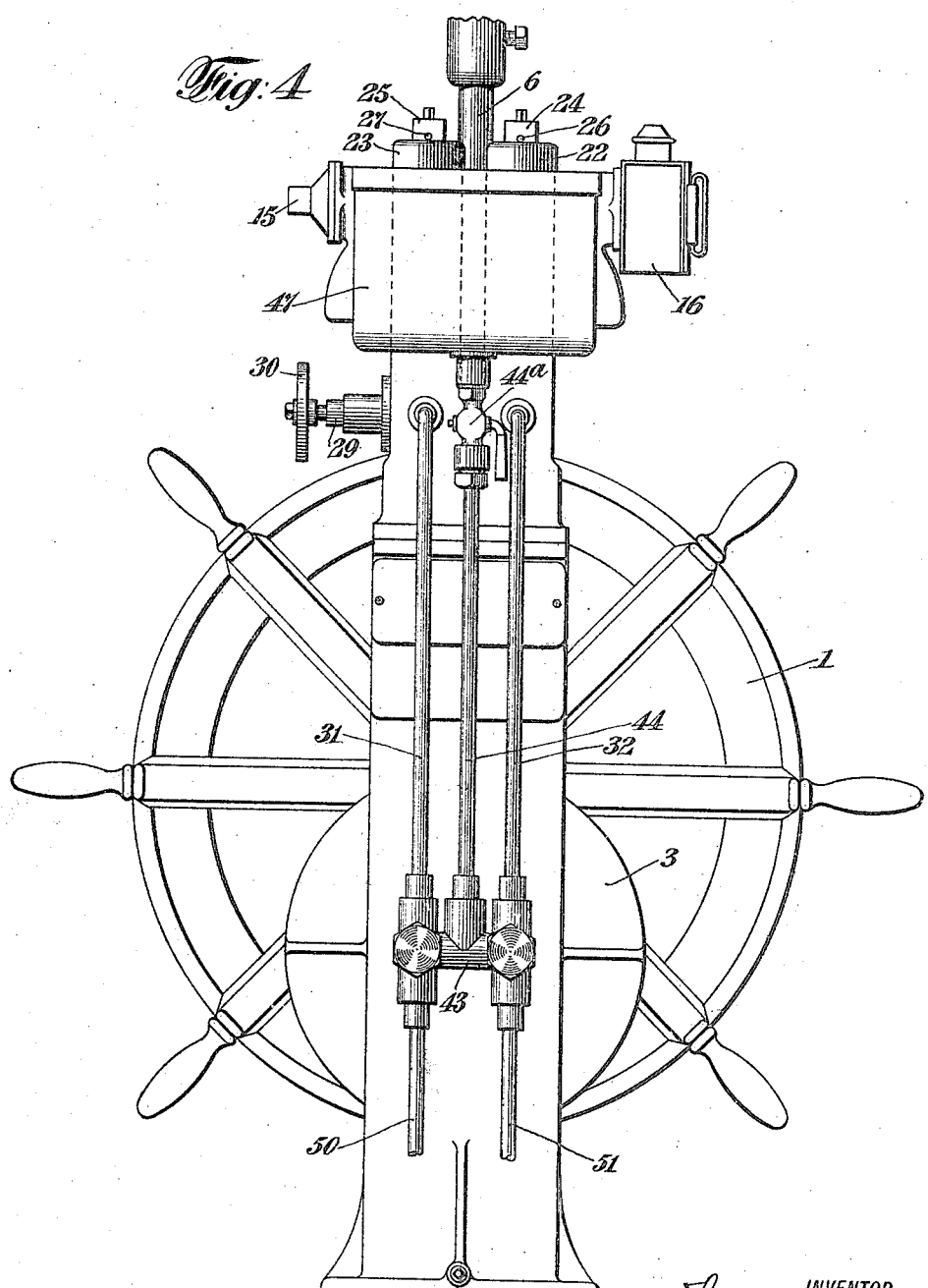

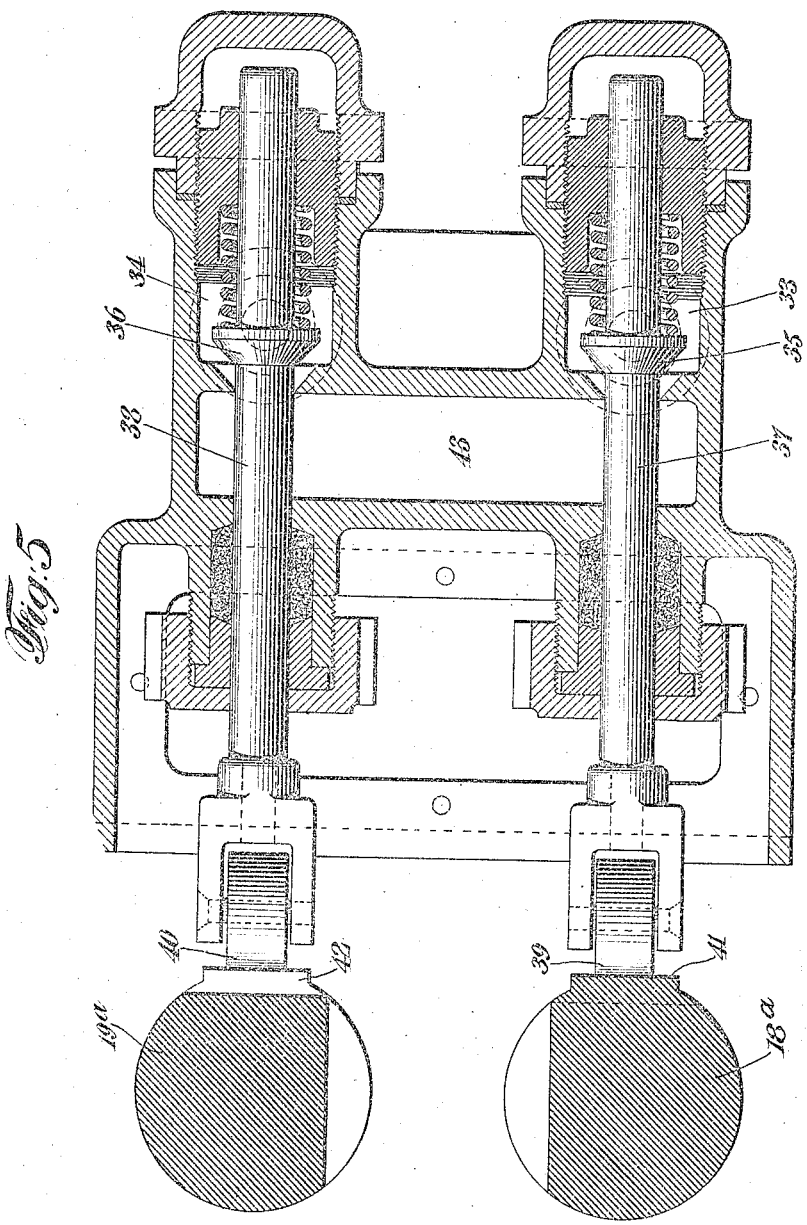

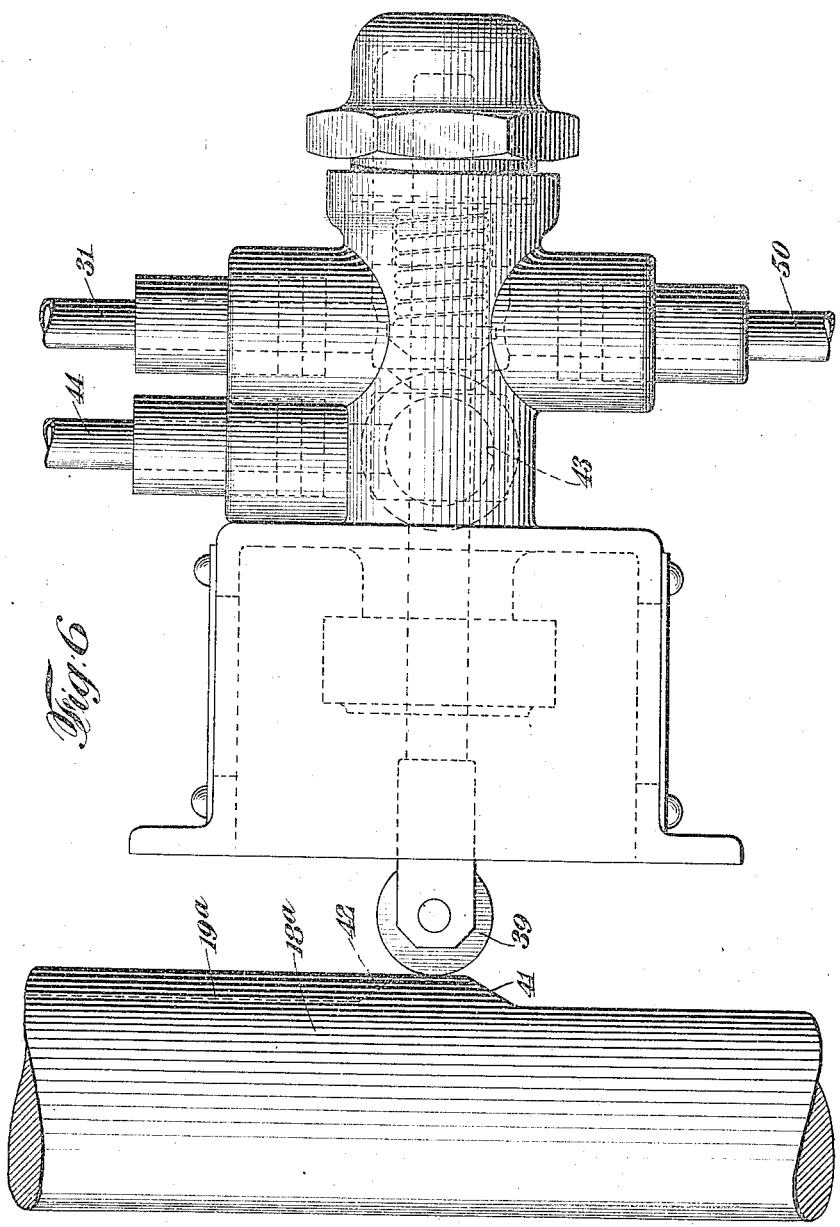

J. F. JOHNSTON.
TELEMOTOR.
APPLICATION FILED MAY 9, 1917.

1,302,376.

Patented Apr. 29, 1919.
12 SHEETS—SHEET 7.

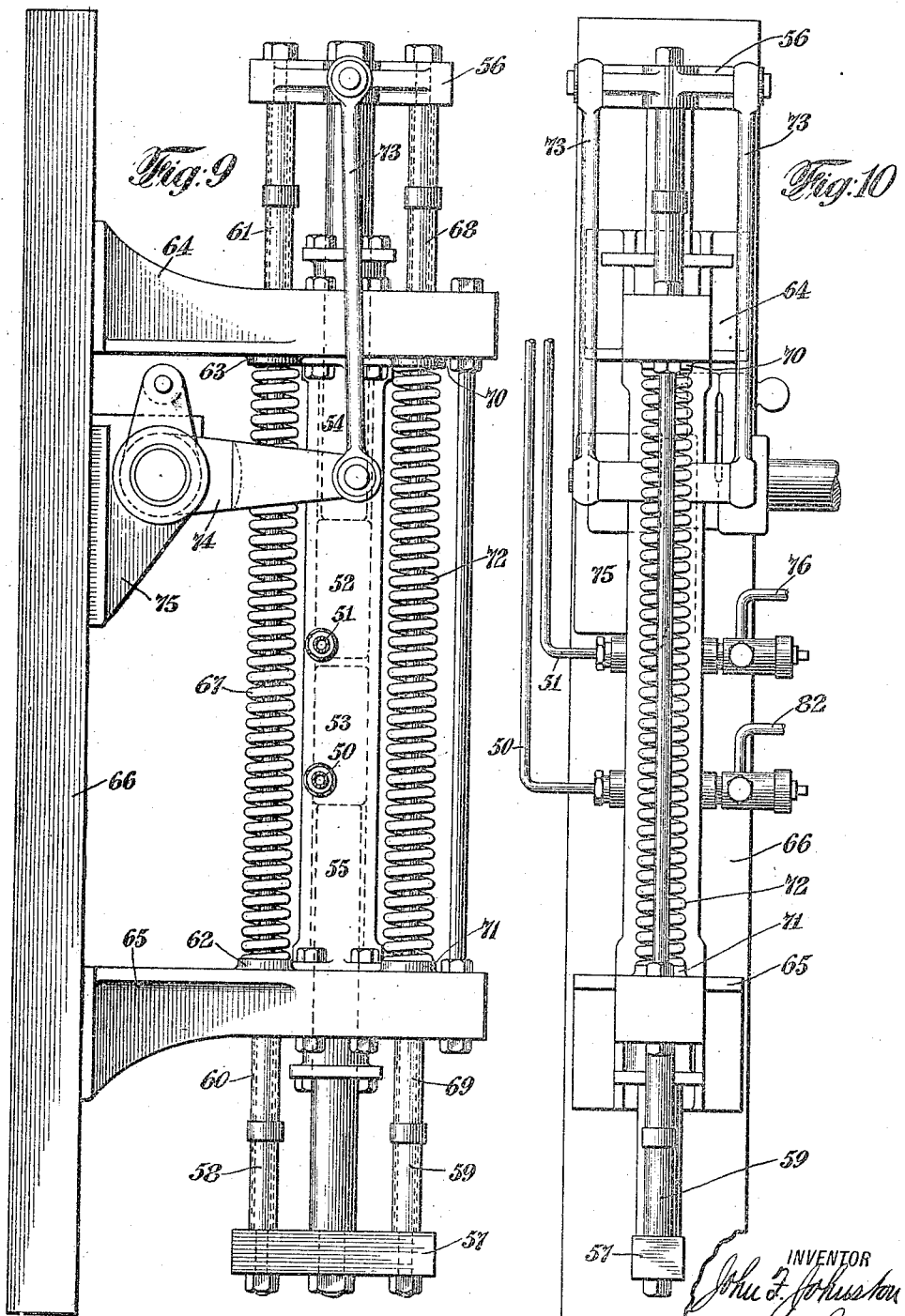

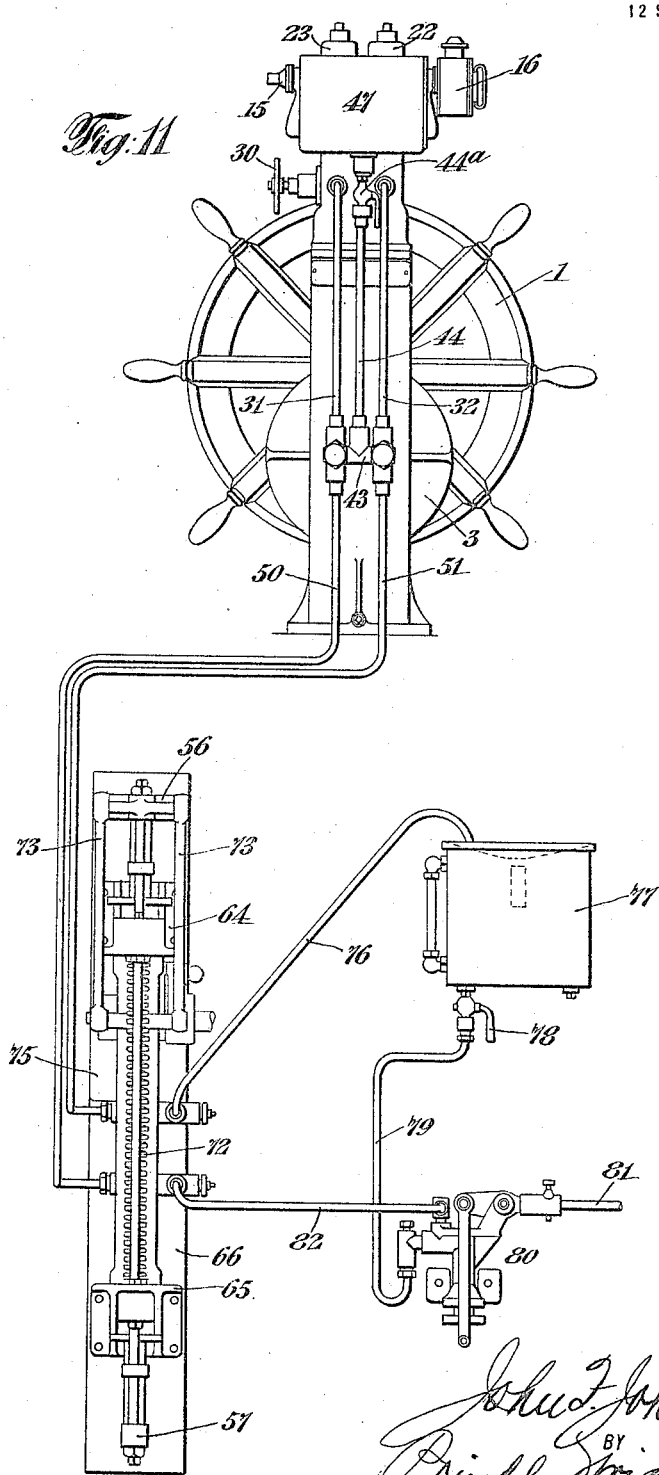

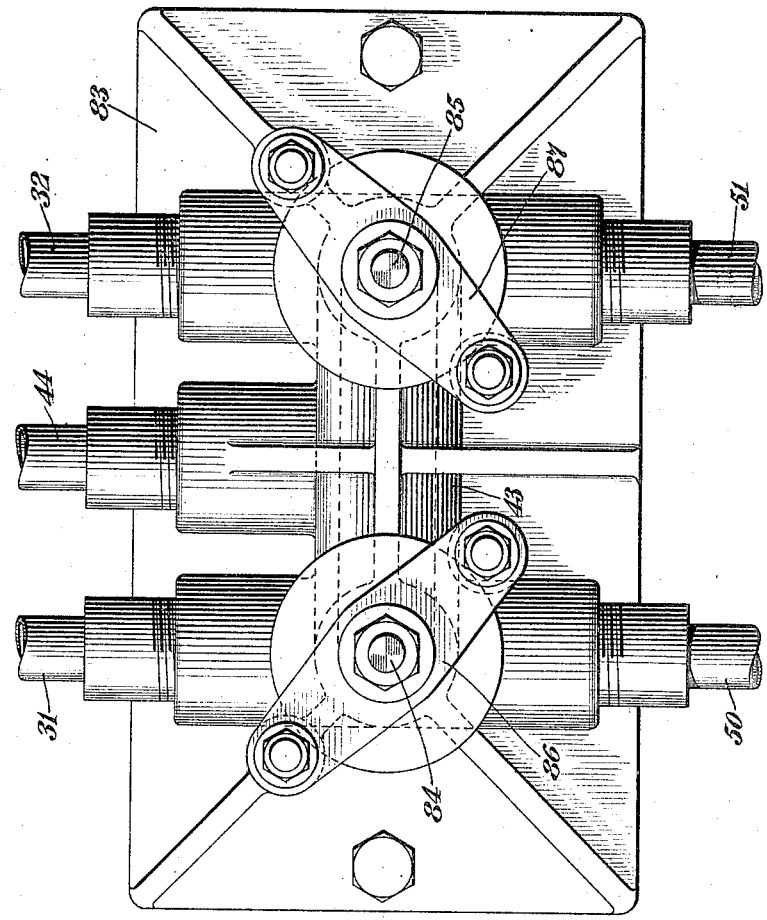

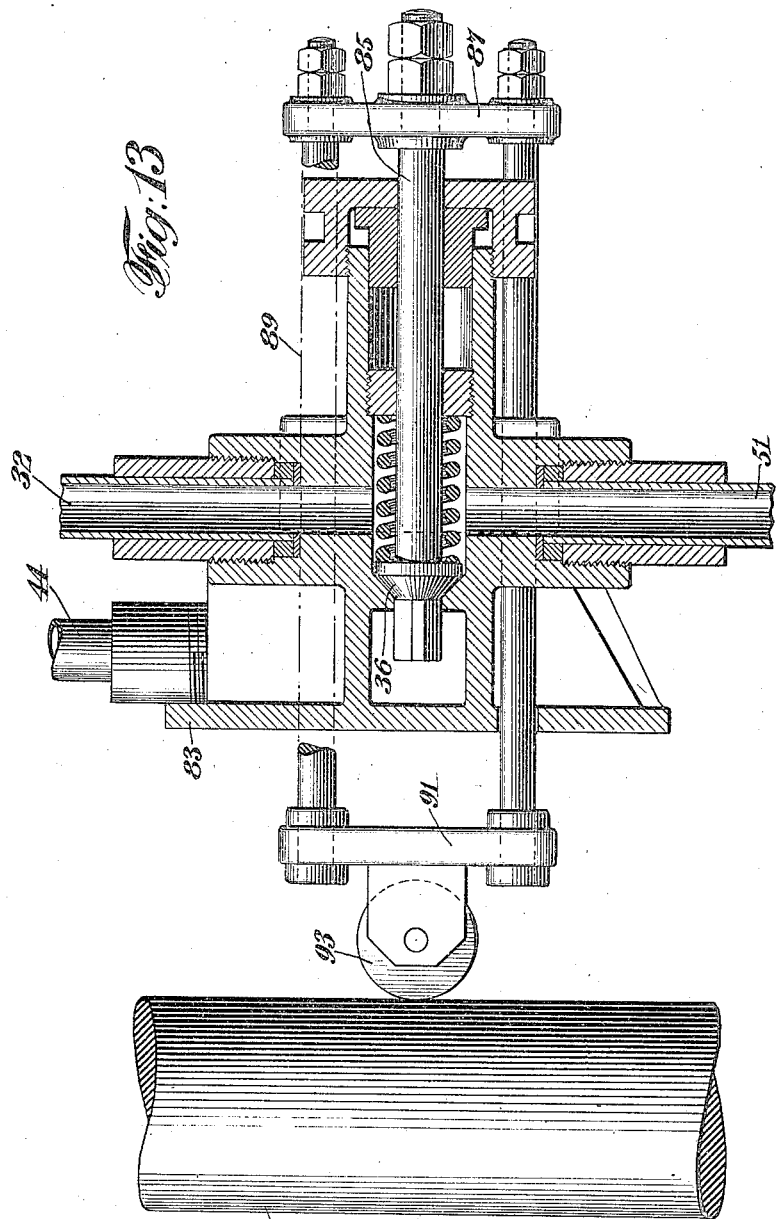

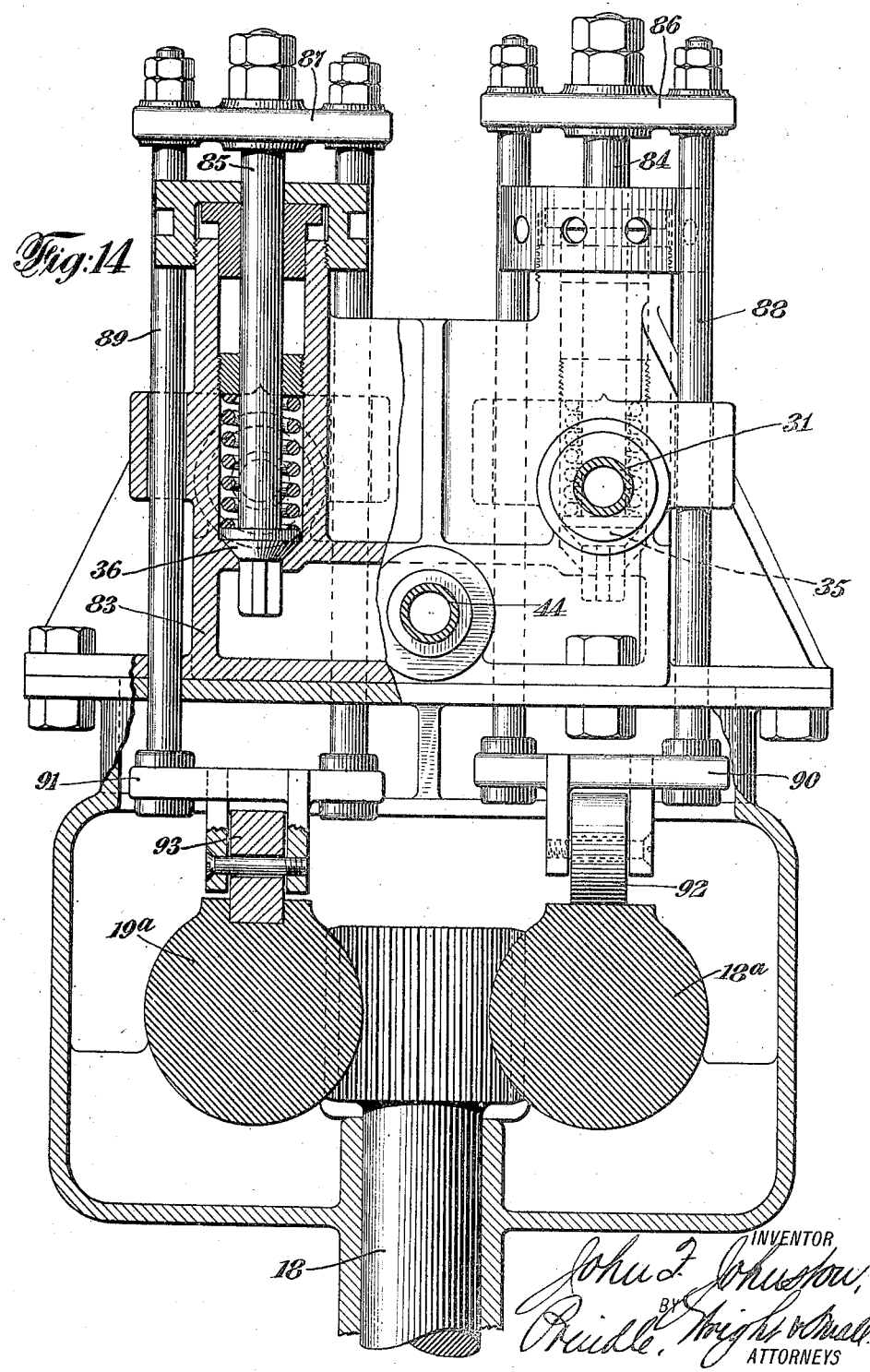

UNITED STATES PATENT OFFICE.

JOHN F. JOHNSTON, OF BETHLEHEM, PENNSYLVANIA.

TELEMOTOR.

1,302,376.

Specification of Letters Patent. Patented Apr. 29, 1919.

Application filed May 9, 1917. Serial No. 167,514.

*To all whom it may concern:*

Be it known that I, JOHN F. JOHNSTON, of Bethlehem, in the county of Northampton and in the State of Pennsylvania, have invented a certain new and useful Improvement in Telemotors, and do hereby declare that the following is a full, clear, and exact description thereof.

My invention relates particularly to an apparatus designed for use in controlling at a distance the movement of apparatus located at a distance from the point where the same is to be controlled, and it has application particularly to controlling the steering mechanism of vessels, although it is capable of use in other ways.

The object of my invention is to provide devices which may be used to control the movement of apparatus at a distance therefrom by means of a body of liquid, and which is so arranged that the liquid system is maintained in equilibrium. A further object is to provide a system of this character in which there is a positive action of the parts and in which the construction is simplified. Further objects of my invention will appear from the detailed description thereof contained hereinafter.

While my invention is capable of embodiment in many different forms, for the purposes of illustration I have shown only one form thereof in the accompanying drawings, in which Figure 1 is a front elevation of the devices adapted to be moved manually so as to control their apparatus located at a distance therefrom;

Fig. 4 is a rear elevation of the same;

Fig. 5 is a horizontal section enlarged, showing a pair of valves used in connection with the same;

Fig. 6 is a side elevation of the same;

Fig. 9 is a plan view of the controlled apparatus which is located at a distance from the controlling devices shown in the preceding figures;

Fig. 10 is a side elevation of the same;

Fig. 11 is a somewhat diagrammatical view showing the controlling devices and controlled apparatus;

Fig. 12 is a rear elevation showing a modified form of arrangement for the valves, such as shown in Figs. 5 to 8.

Fig. 13 is a vertical section through the same;

Fig. 14 is a horizontal section through the same, and

Figure 1:
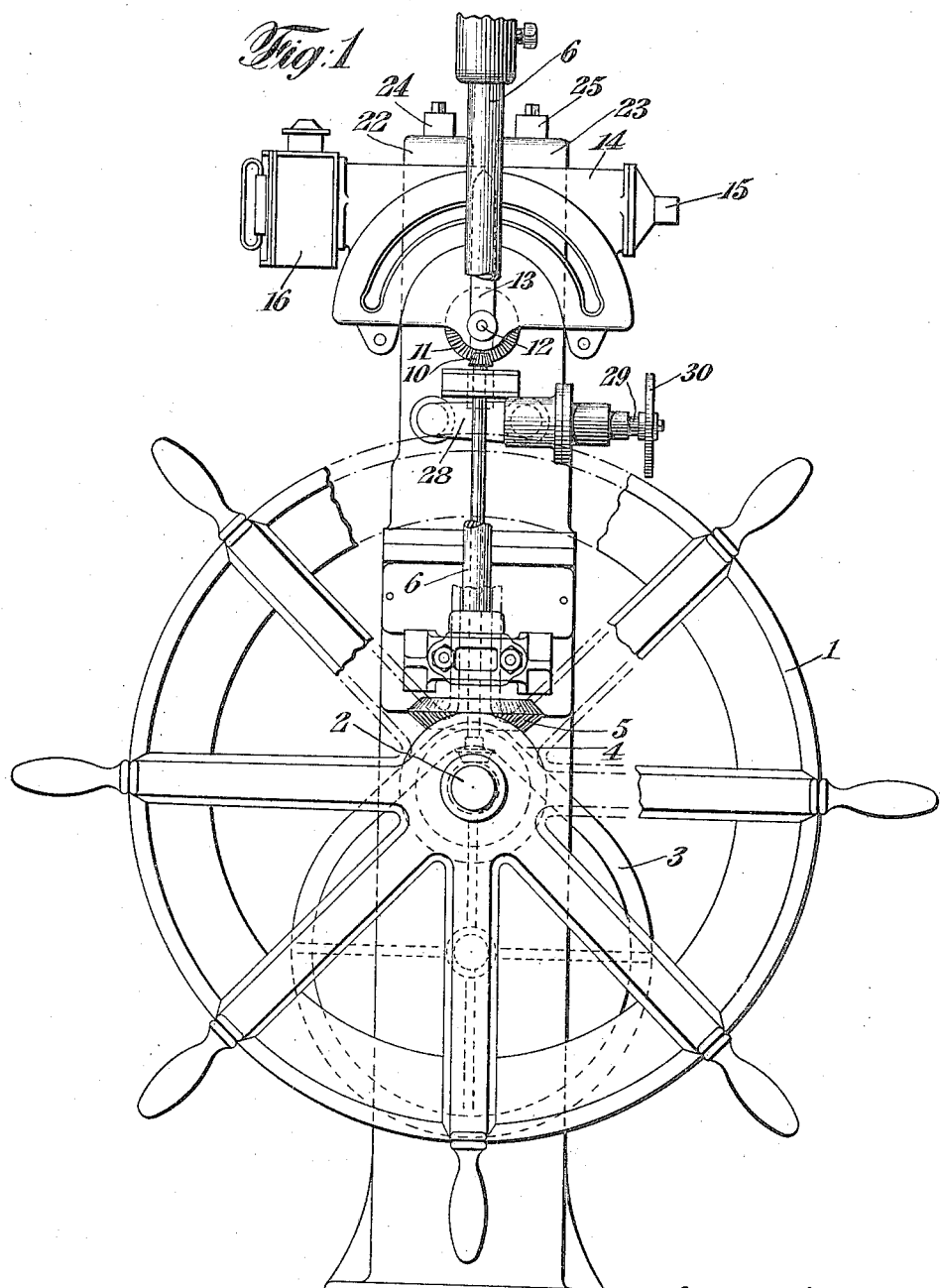
Figure 2:
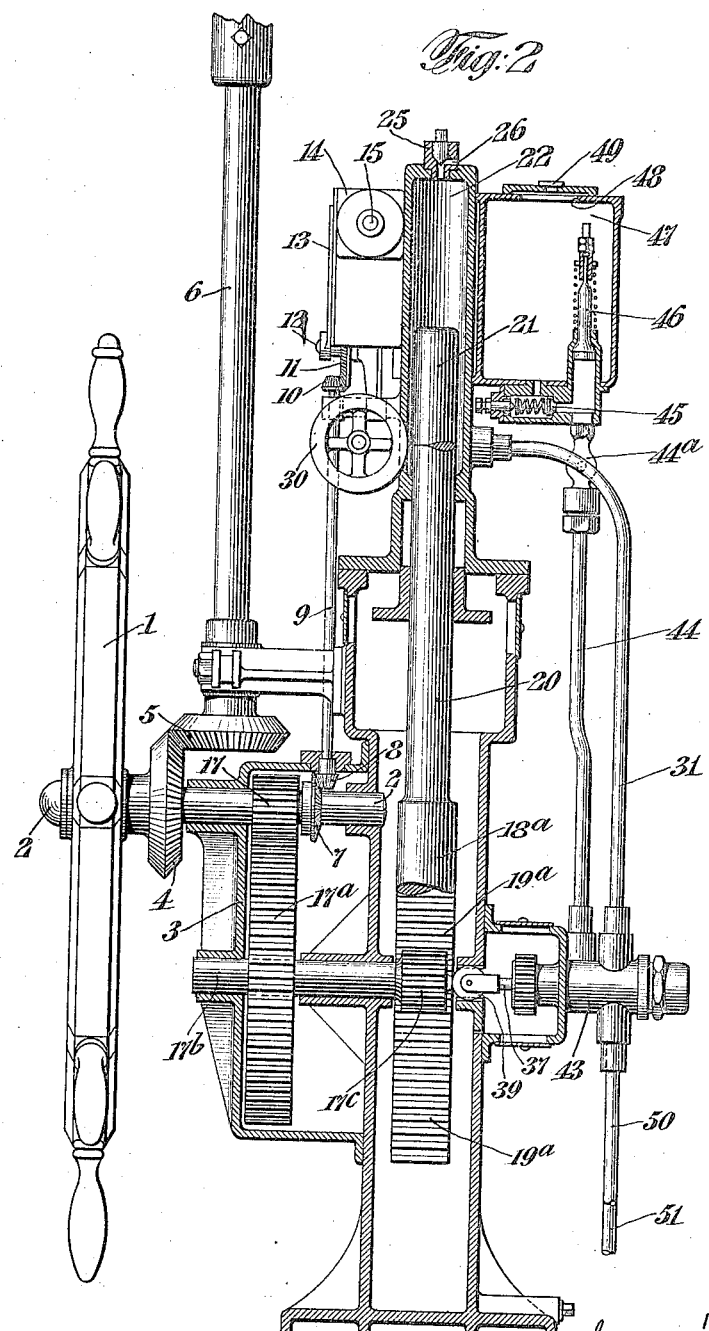
Fig. 2 is a vertical section of the same.
Figure 3:
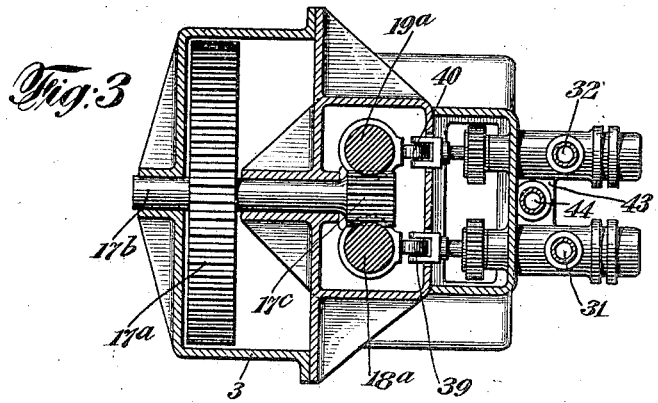
Fig. 3 is a horizontal section of the same.

In the drawings, referring to Figs. 1 to 12, I have shown a hand-wheel 1, of the usual type utilized in the steering of vessels, the same being located on a shaft 2 carried in a casing 3. On the shaft 2 there may be, if desired, a beveled gear 4 which meshes with a beveled gear 5 on a vertical shaft 6, which may lead to another similar hand-wheel, not shown, which may be located on another deck of the vessel. The shaft 2 carries, furthermore, a beveled gear 7 meshing with a beveled gear 8 on a shaft 9 carrying a beveled gear 10, which meshes with another beveled gear 11 on a pointer shaft 12 carrying a pointer 13, the position of which indicates the position of the hand-wheel 1 and the course of the vessel. At the rear of the pointer 13 there is an illuminating apparatus 14 which may be lighted by an electric light 15 from one end, or if preferred, by an oil light 16 (Fig. 1) from the other end. Upon the middle portion of the shaft 2 there is a pinion 17 which meshes with a gear 17$^a$ on a shaft 17$^b$ having a gear 17$^c$ meshing with a pair of racks 18$^a$ and 19$^a$, which are attached respectively to plungers 20 and 21, arranged to operate in cylinders 22 and 23 respectively. At the upper ends of the cylinders 22 and 23 there are plugs 24 and 25 which are arranged to open outlet ports 26 and 27 provided for the escape of air during the initial filling operation of the system. Between the cylinders 22 and 23 there is provided a communicating passageway 28 (Fig. 1) which is controlled by a valve 29, adapted to be operated by an emergency hand-wheel 30, if at any time it is desired to bring the ship suddenly back into its original course. Leading from the cylinders 22 and 23 there are pipes 31 and 32 (Fig. 4)

which communicate with passages 33 and 34 (Fig. 5), which are controlled by spring-pressed valves 35 and 36, located on rods 37 and 38 carrying rollers 39 and 40 adapted to coöperate with cam grooves 41 and 42, located on the sides of the racks 18ª and 19ª respectively. It will be noted that these cam grooves 41 and 42 are so arranged that when the racks 18ª and 19ª are at the same elevation, both of the valves 35 and 36 are open, but that when one of said racks 18ª and 19ª is above the central position and the other below said position, the valve corresponding to the rack which is above the central position is closed, and the valve which corresponds to the rack below the central position is open. This arrangement is provided so that periodically an equilibrium of pressure may be established in the individual bodies of liquid located in the cylinders 22 and 23. In order to bring this about, the valves 35 and 36 are arranged to open communication to a chamber 43 (Fig. 5) which leads by means of pipe 44 (Fig. 2) to a hand-valve 44ª, a check valve 45, and a suction valve 46 communicating with a chamber 47 having a filling opening 48 closed by a plug 49. When either one of the valves 35 or 36 is open, communication is then opened between the cylinder 22 or 23 communicating therewith and the chamber 47, so that in case any pressure below normal exists in the cylinder in question, liquid will be fed from the chamber 47 thereto. Pipes 50 and 51 lead from the chambers 33 and 34 downwardly to cylinders 52 and 53 (Fig. 9), which contain plungers 54 and 55 connected respectively to cross-heads 56 and 57, joined together by rods 58 and 59. Around the rod 58 there are located sleeves 60 and 61 having shoulders 62 and 63 so arranged that the sleeves pass through brackets 64 and 65 on a base 66 in such a way that the shoulders 62 and 63 are on adjacent sides of said brackets. On the rod 58 and between the sleeves 60 and 61 there is a compression spring 67. On the rod 59 there are similar sleeves 68 and 69 having shoulders 70 and 71 arranged with a compression spring 72 between the same in a similar manner. A pair of links 73 join the cross-head 56 to a bell crank lever 74 on a bracket 75 carried by the base 66, the other end of the bell crank lever being arranged to be connected to the valve of a steering engine which is directly connected to the rudder of the vessel. Leading from the cylinder 52 there is a pipe 76 which communicates with a reservoir 77 (Fig. 11), in the bottom of which there is a hand-valve 78 communicating with a pipe 79 which leads to a hand-pump 80 adapted to be operated by a handle 81. From the hand-pump 80 there is a pipe 82 leading to the cylinder 53.

The modification of my invention shown in Figs. 12 to 14 is constructed the same as the form of my invention already described, except that a somewhat different mechanism is provided for operating the valves 35 and 36. This modification of my invention is constructed the same except in the following particulars: In this instance there is a separate casing 83 bolted to the outside of the main casing 3, and the valves 35 and 36 therein are provided with valve stems 84 and 85 connected respectively to cross-heads 86 and 87, having connecting rods 88 and 89 leading to cross-heads 90 and 91 carrying rollers 92 and 93, which operate in the same manner as the rollers 39 and 40 previously described.

Figure 15:
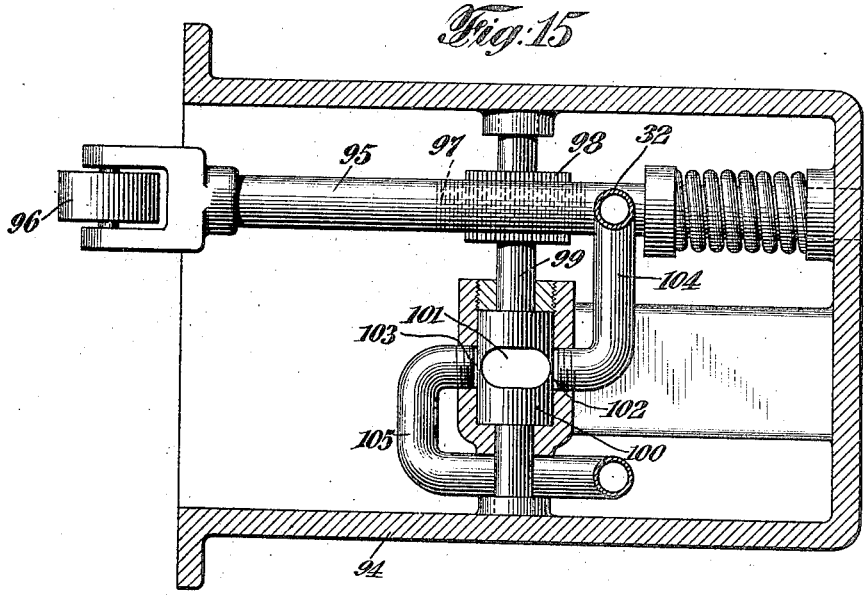
Fig. 15 is a vertical section through another modified form of valve arrangement.
Figure 7:
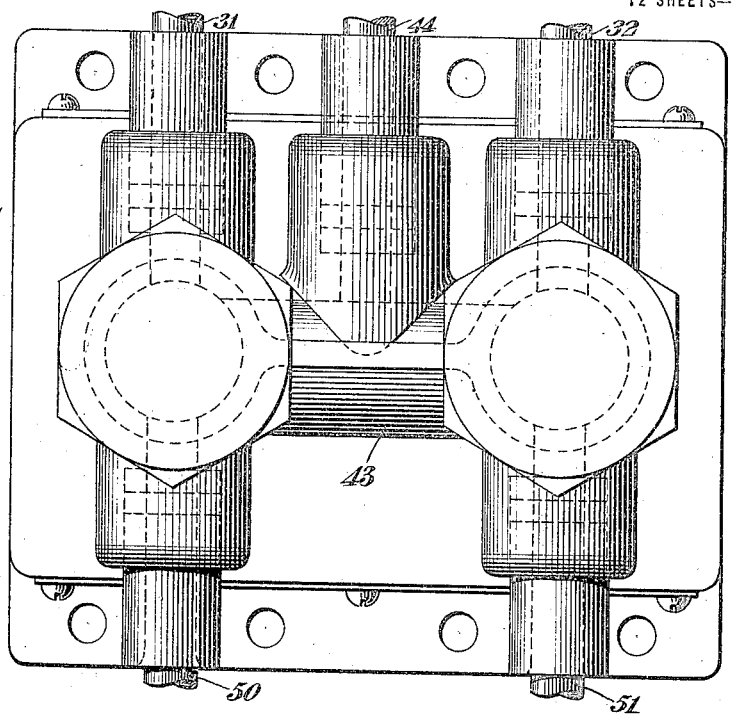
Fig. 7 is a rear elevation of the same.
Figure 8:
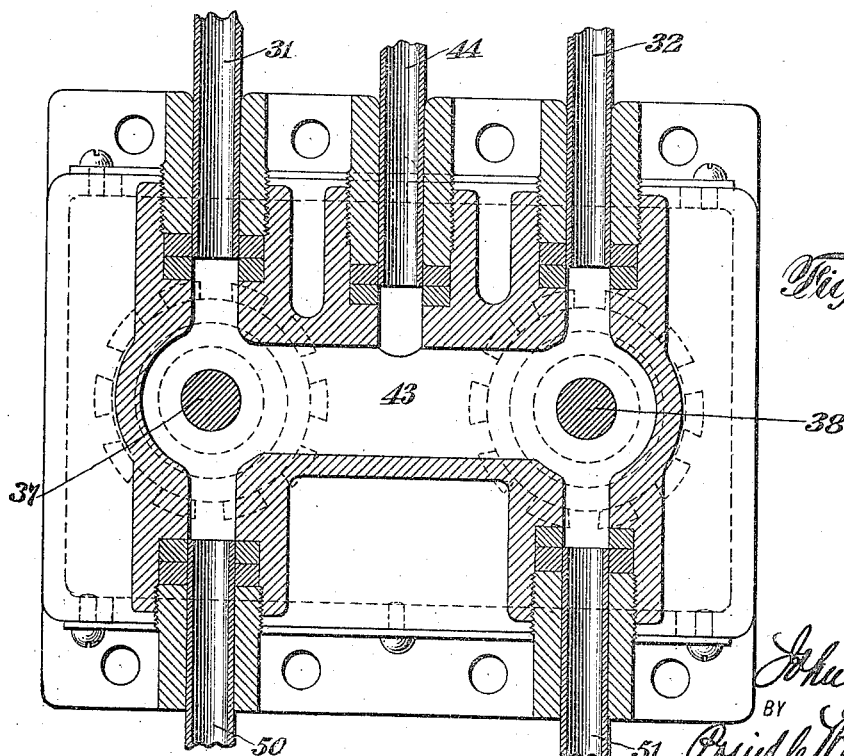
Fig. 8 is a vertical section of the same.

The modification of my invention shown in Fig. 15 is constructed the same as the form of my invention shown in Figs. 1 to 12 except that instead a different mechanism is provided for periodically opening communication with the pipe 44 to establish equilibrium in the liquid systems. The construction in this form of my invention is the same except in the following respects: In this instance I have provided an outside casing 94 which may be bolted to the main casing 3, the same having a spring-pressed plunger 95 thereon, carrying a roller 96. On the plunger 95 there is a rack 97 to operate a gear 98 on a shaft 99 carrying a valve 100. Said valve 100 has an upper wide port 101 adapted to communicate with the pipe 44, and it has on the two sides thereof two shorter ports 102 and 103 which communicate respectively with branch pipes 104 and 105 leading to the pipes 32 and 31 respectively.

In the operation of my invention, the apparatus is first operated so as to completely fill it with operating liquid, which may be water, oil, or any other desired liquid. This is done by opening the hand-valve 78 and operating the pump 80 by means of the hand-lever 81, it being understood that the hand-wheel 1 is in middle position, and that both of the cylinders 22 and 23 are therefore in communication with the chamber 47. In the operation of the hand lever 81 the liquid is thus circulated for some time until all of the air has escaped out from the openings 26 and 27, the plugs 24 and 25 having been previously unscrewed to a slight extent for this purpose. When the system has thus become entirely filled with liquid and the air has been allowed to escape, said plugs 24 and 25 are again screwed into place, and the hand valve 78 is closed. When now it is desired to control the course of the vessel, the hand-wheel 1 is moved, in the right direction as indicated by the movement of the pointer 13. This will force liquid from one of the cylinders 22 and 23 to the corresponding one of the cylinders 52 and 53, and will release the pressure in the other one of said cylinders 22 and 23, thus releasing the pressure in the one of the cylinders 52 and 53 corresponding thereto. The one of the cylinders 52 and 53 receiving the increased pressure will then force its piston outwardly, thus moving one of the cross-heads 56 and 57 inwardly and compressing the springs 67 and 72. This will result in the movement of the bell crank lever 74 in the desired direction, thus operating the steering engine, and as a consequence the rudder of the vessel. Upon the opposite direction of movement of the hand-wheel 1, the rudder will be moved in a similar way in the opposite direction. If desired, these movements of the hand-wheel 1 may be effected by a hand-wheel, not shown, which is attached to the shaft 6 on another deck of the vessel. When the pressure in either one of the cylinders 22 and 23 is released and the liquid is not being placed under compression to move the steering mechanism, the one of the valves 35 and 36 corresponding thereto is open by reason of the cam surfaces 41 and 42 cooperating therewith, thus opening communication between said cylinder and the reservoir 47 so as to admit further liquid to said cylinder to bring it up to the normal pressure. This restoration of normal pressure will of course occur in both of the cylinders 22 and 23 from time to time, as said cylinders are alternately subjected to the decreased pressure as the vessel is turned from one direction to the other. If at any time it is necessary to immediately bring the steering mechanism to its middle position, the emergency hand-wheel 30 may be operated to open communication between the cylinders 22 and 23, whereupon the compression springs 67 and 72 will restore the parts to the middle position immediately.

The form of my invention shown in Figs. 12 to 14 operates in the same manner except that in this instance the connecting devices between the valves 35 and 36 with the cam surfaces 41 and 42 are located outside of the liquid containing chambers.

The form of my invention shown in Fig. 15 operates in the same manner as the form of my invention shown in Figs. 1 to 11, except that in this instance, instead of using two valves 35 and 36 and two rollers 39 and 40, there is only one roller 96 and one plunger 95 attached thereto and one valve 100 operated thereby, although the cylinders 22 and 23 are caused to communicate with the reservoir 47 in substantially the same way.

While I have described my invention above in detail, I wish it to be understood that many changes may be made therein without departing from the spirit of my invention.

I claim:

1. A telemotor comprising liquid controlling devices including a cylinder and piston, and devices comprising a valve for restoring a normal quantity of liquid to the cylinder at intervals mechanically operated from said piston.

2. A telemotor comprising liquid controlling devices including a cylinder and piston, and devices for restoring a normal quantity of liquid to the cylinder at intervals mechanically operated from said piston, said devices comprising a liquid reservoir and a valve leading from the same to the cylinder.

3. A telemotor comprising liquid controlling devices including a cylinder and piston, and devices for restoring a normal quantity of liquid to the cylinder at intervals mechanically operated from said piston, said devices comprising a liquid reservoir and a valve leading from the same to the cylinder, said valve being arranged to be moved by the piston.

4. A telemotor comprising liquid controlling devices including a cylinder and piston, and devices for restoring a normal quantity of liquid to the cylinder at intervals mechanically operated from said piston, said devices comprising a liquid reservoir and a valve leading from the same to the cylinder, said valve being arranged to be moved by the piston by means of a cam surface provided on the piston.

5. A telemotor comprising liquid controlling devices including a cylinder and piston, and devices for restoring a normal quantity of liquid to the cylinder at intervals adapted to be operated from said piston, said devices comprising a liquid reservoir and a valve leading from the same to the cylinder, said valve being arranged to be moved by the piston by means of a cam surface provided on the piston coöperating with a roller on the valve.

6. A telemotor comprising liquid controlling devices including a cylinder and piston, and devices comprising a valve for restoring a normal quantity of liquid to the cylinder at intervals when the liquid in the cylinder is under decreased pressure, mechanically operated from said piston.

7. A telemotor comprising liquid controlling devices including a cylinder and piston, and devices for restoring a normal quantity of liquid to the cylinder at intervals when the liquid in the cylinder is under decreased pressure, mechanically operated from said piston, said devices comprising a liquid reservoir and a valve leading from the same to the cylinder.

8. A telemotor comprising liquid controlling devices including a cylinder and piston, and devices for restoring a normal quantity of liquid to the cylinder at intervals when the liquid in the cylinder is under decreased pressure, mechanically operated from said piston, said devices comprising a liquid reservoir and a valve leading from the same to the cylinder, said valve being arranged to be moved by the piston.

9. A telemotor comprising liquid controlling devices including a cylinder and piston, and devices for restoring a normal quantity of liquid to the cylinder at intervals when the liquid in the cylinder is under decreased pressure, mechanically operated from said piston, said devices comprising a liquid reservoir and a valve leading from the same to the cylinder, said valve being arranged to be moved by the piston by means of a cam surface provided on the piston.

10. A telemotor comprising liquid controlling devices including a cylinder and piston, and devices for restoring a normal quantity of liquid to the cylinder at intervals when the liquid in the cylinder is under decreased pressure, adapted to be operated from said piston, said devices comprising a liquid reservoir and a valve leading from the same to the cylinder, said valve being arranged to be moved by the piston by means of a cam surface provided on the piston coöperating with a roller on the valve.

11. A telemotor comprising a controlled apparatus, liquid controlling devices for the same including a cylinder and piston, and devices comprising a valve for restoring a normal quantity of liquid to the cylinder at intervals mechanically operated from said piston, and another cylinder and piston of the same character arranged to operate alternately with the first mentioned cylinder and piston in such a manner that one of the cylinders and pistons brings about the movement of the controlled apparatus in one direction, and the other cylinder and piston brings about the movement thereof in the other direction.

12. A telemotor comprising a controlled apparatus, liquid controlling devices for the same including a cylinder and piston, and devices for restoring a normal quantity of liquid to the cylinder at intervals mechanically operated from said piston, said devices comprising a liquid reservoir and a valve leading from the same to the cylinder, and another cylinder and piston of the same character arranged to operate alternately with the first mentioned cylinder and piston in such a manner that one of the cylinders and pistons brings about the movement of the controlled apparatus in one direction, and the other cylinder and piston brings about the movement thereof in the other direction.

13. A telemotor comprising a controlled apparatus, liquid controlling devices for the same including a cylinder and piston, and devices for restoring a normal quantity of liquid to the cylinder at intervals mechanically operated from said piston, said devices comprising a liquid reservoir and a valve leading from the same to the cylinder, said valve being arranged to be moved by the piston, and another cylinder and piston of the same character arranged to operate alternately with the first mentioned cylinder and piston in such a manner that one of the cylinders and pistons brings about the movement of the controlled apparatus in one direction, and the other cylinder and piston brings about the movemnt thereof in the other direction.

14. A telemotor comprising a controlled apparatus, liquid controlling devices for the same including a cylinder and piston, and devices for restoring a normal quantity of liquid to the cylinder at intervals mechanically operated from said piston, said devices comprising a liquid reservoir and a valve leading from the same to the cylinder, said valve being arranged to be moved by the piston by means of a cam surface provided on the piston, and another cylinder and piston of the same character arranged to operate alternately with the first mentioned cylinder and piston in such a manner that one of the cylinders and pistons brings about the movement of the controlled apparatus in one direction, and the other cylinder and piston brings about the movement thereof in the other direction.

15. A telemotor comprising a controlled apparatus, liquid controlling devices for the same including a cylinder and piston, and devices for restoring a normal quantity of liquid to the cylinder at intervals mechanically operated from said piston, said devices comprising a liquid reservoir and a valve leading from the same to the cylinder, said valve being arranged to be moved by the piston by means of a cam surface provided on the piston coöperating with a roller on the valve, and another cylinder and piston of the same character arranged to operate alternately with the first mentioned cylinder and piston in such a manner that one of the cylinders and pistons brings about the movement of the controlled apparatus in one direction, and the other cylinder and piston brings about the movement thereof in the other direction.

16. A telemotor comprising a controlled apparatus, liquid controlling devices for the same including a cylinder and piston, and devices comprising a valve for restoring a normal quantity of liquid to the cylinder at intervals when the liquid in the cylinder is under decreased pressure, mechanically operated from said piston, and another cylinder and piston of the same character arranged to operate alternately with the first mentioned cylinder and piston in such a manner that one of the cylinders and pistons brings about the movement of the controlled apparatus in one direction, and the other cylinder and piston brings about the movement thereof in the other direction.

17. A telemotor comprising a controlled apparatus, liquid controlling devices for the same including a cylinder and piston, and devices for restoring a normal quantity of liquid to the cylinder at intervals when the liquid in the cylinder is under decreased pressure, mechanically operated from said piston, said devices comprising a liquid reservoir and a valve leading from the same to the cylinder, and another cylinder and piston of the same character arranged to operate alternately with the first mentioned cylinder and piston in such a manner that one of the cylinders and pistons brings about the movement of the controlled apparatus in one direction, and the other cylinder and piston brings about the movement thereof in the other direction.

18. A telemotor comprising a controlled apparatus, liquid controlling devices for the same including a cylinder and piston, and devices for restoring a normal quantity of liquid to the cylinder at intervals when the liquid in the cylinder is under decreased pressure, mechanically operated from said piston, said device comprising a liquid reservoir and a valve leading from the same to the cylinder, said valve being arranged to be moved by the piston, and another cylinder and piston of the same character arranged to operate alternately with the first mentioned cylinder and piston in such a manner that one of the cylinders and pistons brings about the movement of the controlled apparatus in one direction, and the other cylinder and piston brings about the movement thereof in the other direction.

19. A telemotor comprising a controlled apparatus, liquid controlling devices for the same including a cylinder and piston, and devices for restoring a normal quantity of liquid to the cylinder at intervals when the liquid in the cylinder is under decreased pressure, mechanically operated from said piston, said devices comprising a liquid reservoir and a valve leading from the same to the cylinder, said valve being arranged to be moved by the piston by means of a cam surface provided on the piston, and another cylinder and piston of the same character arranged to operate alternately with the first mentioned cylinder and piston in such a manner that one of the cylinders and pistons brings about the movement of the controlled apparatus in one direction, and the other cylinder and pistons brings about the movement thereof in the other direction.

20. A telemotor comprising a controlled apparatus, liquid controlling devices for the same including a cylinder and piston, and devices for restoring a normal quantity of liquid to the cylinder at intervals when the liquid in the cylinder is under decreased pressure, adapted to be operated from said piston, said devices comprising a liquid reservoir and a valve leading from the same to the cylinder, said valve being arranged to be moved by the piston by means of a cam surface provided on the piston coöperating with a roller on the valve, and another cylinder and piston of the same character arranged to operate alternately with the first mentioned cylinder and piston in such a manner that one of the cylinders and pistons brings about the movement of the controlled apparatus in one direction, and the other cylinder and piston brings about the movement thereof in the other direction.

In testimony that I claim the foregoing I have hereunto set my hand.

JOHN F. JOHNSTON.

Copies of this patent may be obtained for five cents each, by addressing the "Commissioner of Patents, Washington, D. C."